United States Patent [19]
Kasser et al.

[11] Patent Number: 5,589,981
[45] Date of Patent: Dec. 31, 1996

[54] RETROREFLECTOR TARGET FOR LASER RANGING

[75] Inventors: Michel Kasser, Joinville-Le-Pont; Glenn Lund, Peillon, both of France

[73] Assignee: Aerospatiale Societe Nationale Industrielle, Paris, France

[21] Appl. No.: 401,188

[22] Filed: Mar. 9, 1995

[30] Foreign Application Priority Data

Mar. 10, 1994 [FR] France .................. 94 02773

[51] Int. Cl.$^6$ .................. G02B 5/122
[52] U.S. Cl. .................. 359/529; 356/152.3; 342/7; 224/167
[58] Field of Search .................. 359/529–530; 356/152.3; 342/7; 224/167

[56] References Cited

U.S. PATENT DOCUMENTS

| | | | |
|---|---|---|---|
| 4,472,054 | 9/1984 | Pouit | 356/352 |
| 5,202,743 | 4/1993 | Lund et al. | 356/5 |
| 5,207,003 | 5/1993 | Yamada et al. | 33/293 |
| 5,474,264 | 12/1995 | Lund et al. | 244/171 |

FOREIGN PATENT DOCUMENTS 0506517  9/1992  European Pat. Off. .
0571256  11/1993  European Pat. Off. .
2082867  3/1982  United Kingdom .

*Primary Examiner*—James Phan
*Attorney, Agent, or Firm*—Remy J. VanOphem; Thomas A. Meehan; John VanOphem

[57] ABSTRACT

Retroreflective target for laser ranging embodying at least one hollow cube corner retroreflector constituted by three reflective surfaces which are substantially planar and perpendicular to each other and intersect at three edges which are substantially orthogonal and converge at an apex (S), the cube corner retroreflector being associated with a geometrical normal at the same angle to each of the edges, the target including a reference point (O) substantially on the normal on the opposite side to the reflective surfaces at a distance e. $\sqrt{3}$ from the apex (S), where e is the distance of this reference point from each of the surfaces, the target being characterized in that it has, facing each reflective surface, a parallel-sided plate (E1, E2, E3) which is transparent to the light to be retroreflected and made from a material having a known refractive index the plates (E1, E2, E3, CV) associated with the retroreflector having the same thickness e' such that, at least approximately:

$$e' \cdot \sqrt{n} = 2.35e.$$

13 Claims, 3 Drawing Sheets

RETROREFLECTOR TARGET FOR LASER RANGING

BACKGROUND OF THE INVENTION

1. Field of the Invention

The invention concerns laser ranging including space laser ranging. It concerns in particular satellite laser ranging (SLR). SLR measures the time for a laser pulse to make the return trip between a laser ground station and a target carried by a satellite (or vice versa), for example, and then converts the measured time into an (instantaneous) distance between a reference point of the laser station and the center of mass of the satellite, including correction of various deterministic effects. SLR includes the situation in which the distance measured is that between two artificial satellites, between a satellite and a target on the ground, and even more generally between natural or artificial heavenly bodies.

2. Description of the Prior Art

It is as well to remember that all "laser" satellites in earth orbit at this time (such as the LAGEOS I and II, AJISAI, STARLETTE, and STELLA satellites) were designed at a time when SLR was a relatively imprecise art and the lasers employed were low-power devices (as compared to what is possible today). These satellites were therefore optimized for targets composed of many (from 60 to more than 2,000) small "cube corner" retroreflectors capable of sending back a detectable quantity of light to the transmitter station regardless of the orientation of the satellite. It was not very important if for any laser firing they were not all exactly the same distance from the transmitter station, to within a few centimeters or even decimeters.

The situation has changed greatly in the past few years with the result that current SLR stations can use pulse durations as low as about ten picoseconds (1 ps=$10^{-12}$ seconds), and the measurement accuracy on a single echo is approaching one millimeter. This does not apply to the final measurement accuracy because of the multiplicity of echos (one echo from each retroreflector visible to the transmitter at the time of firing), which causes temporal spreading of the return pulses (in respect of which the term "signature" is sometimes used), which echoes cannot be individually and precisely associated with the instantaneous distance to the center of mass of the satellite.

Even with highly sophisticated SLR tools, this effect makes it virtually impossible to determine the distance of laser satellites with an absolute accuracy better than one centimeter from a single pulse, and even this is possible only in specific cases with small satellites.

For completeness, it should be mentioned that the relative transverse speed between the satellite and the laser station causes a speed aberration phenomenon that is corrected on existing satellites by imposing small differences ("errors") on the angles between the reflective faces of the cube corners relative to the nominal value of 90°.

The cube corners are usually solid and are deliberately made small (length of diameter 3 cm to 4 cm) for two reasons:

the diffraction pattern of the lightwave that they reflect constitutes a sort of continuous ring whose radius and width correspond to the values needed for adequate compensation of the speed aberration, rather than six distinct and separate lobes (this is the effect of the small angle errors); and because of the small size of the cube corners, the temperature gradients likely to arise within the glass from which the cube corners are made remain small and consequently have little effect in terms of degradation of the resultant diffraction pattern.

Given this background, the need arises to satisfy the following requirements to the greatest possible degree:

α—to return a sufficient quantity of flux (energy) to the receiver of the transmitter station by adequate correction of the speed aberration, combined with minimizing of the temporal "signature" (it is accepted that it is not essential for the retroreflective efficacy of the satellite to be constant during (largely unknown) movements of the satellite);

β—to eliminate any influence likely to broaden the pulses sent back by the satellite;

to obtain a virtually null uncertainty (ideally 1 mm or less) in the determination of the distance between a reference point of the laser station and the center of mass of the satellite from measurements of the retroreflector distance, regardless of the angles of incidence of the light pulses on the satellite; and δ—to maximize the density of the system to minimize disturbances from non-gravitational forces.

In the context of the Earth remote sensing requirements mentioned above, European Patents A 0,506,517, A 0,571,256 and French Patent 2,691,129 describe the assembly of a small number of large retroreflectors on a common structure to constitute a remote sensing microsatellite enabling existing and future stations to achieve millimeter measurement accuracy in measurement of large distances.

The use of large cube corner retroreflectors (CCR) which are hollow rather than solid as on present day satellites should make it possible to achieve an appropriate energy balance for the satellite plus CCR system. Given the energy and the duration of the pulses transmitted by modern SLR stations, assuming orbit altitudes between 300 km and 6,000 km for this type of satellite, and given the angular spreading of the energy retroreflected by the CCR and the typical size of the receiving telescope in a station of this kind (pupil diameter in the order of 50 cm), it can be shown that a single retroreflector having a diameter typically between 10 cm and 20 cm should be able to satisfy the energy balance requirements of the system.

In a preferred embodiment described in French Patent A 2,691,129, the target is formed by eight cube corners having their apexes close together.

In this instance only rays at grazing incidence to the reflective face of one cube corner (and consequently of null efficacy with respect to return to the transmitter station) can be in the field of view of one or more adjacent CCR. As this is a rare case, it can be assumed that this configuration is characterized by non-overlapping fields of view of the retroreflectors, i.e. a single echo detected on return.

The question then arises of determining the distance to the center of mass (or any other reference point) of the target from a single echo sent back by a CCR whose apex is at a distance from the center of mass (or reference point) when it is necessary to dispense with any demands in terms of attitude control or, more generally, any demands in respect of the relative orientation of the laser transmitter/receiver (E/R) and the CCR (the latter can be on the Earth or on the Moon and the T/R trajectory has a random orientation relative to that of the CCR).

In other words, the problem is to deduce, from the distance between the E/R reference point and the apex of the CCR that can be measured by means of a single echo sent back by the CCR, the distance between a reference point of the E/R and a reference point associated with the CCR at a distance from the apex of the CCR when:

the position of the reference point associated with the CCR relative to the apex of the latter is known;

but the orientation relative to the CCR of the direction in which the CCR receives and returns the laser radiation forming the echo is not known a priori.

When the CCR is on a satellite (which is a small body in practice), the associated reference point is usually the center of mass of the satellite. In this case, the center of mass preferably has the same position relative to each CCR if the satellite carries a plurality of CCR adapted to return a single echo. More generally, if the CCR is part of a plurality of CCR mounted on a common support structure fixed relative to a natural or artificial object (Earth, Moon, or satellite of any size), the reference point is chosen to have the same position relative to each CCR. In the simplest case, this CCR reference point is on the normal of each CCR at the same distance $d_o$ from the apex S of the CCR (at least approximate convergence of the normals to all the CCR at one and the same point is then an installation constraint in respect of the CCR). The simple case generalizes to a single CCR whose reference point O is at a negative distance $d_o$ from the apex S on the normal $\vec{n}$ of the CCR. This distance $d_o$ is sometimes called the "optical constant".

This optical constant is the correction to be applied to the measured distance (E/R - CCR apex) to obtain the distance to the reference point along the normal to the CCR. As shown in FIG. 1, for a ray at any angle of incidence i to the normal, the corresponding value of the correction d is less than $d_o$ and depends on i. The value of d is given by the expression $d=d_o\cos(i)$. The mean value ($d_{avg}$) of d and the excursions —called errors δ—relative to this mean depend on $d_o$ and on all of the angles of incidence i for which the measurements can be made. For example, if the measurements can be made only for rays within a cone having a half-angle of 35° to the normal of the CCR (i.e. for $i \leq 35°$), it can be shown that $d_{avg}$ has a value of approximately $0.9d_o$ and that the maximum errors δ relative to $d_{avg}$ reach a value of $\pm 0.1d_0$. Taking $d_o$=5 cm, an average value $d_{avg}$ close to 4.5 cm is obtained, with maximum errors such that $-0.5 \text{ cm} \leq \delta \leq +0.5$ cm.

As described in European Patent A 0,571,256, the correction required to the distance to the apex S to obtain the distance to the reference point O (if i varies between 0° and 35° in any direction transverse to the normal of the CCR) varies between $0.8d_o$ and $d_o$. In other words, $0.9d_o$ is an estimate of this correction to the nearest $0.1d_o$.

SUMMARY OF THE INVENTION

An object of the invention is to minimize this uncertainty as to $d_o$ in the aforementioned context.

To this end, the present invention proposes a retroreflective target for laser ranging embodying at least one hollow cube corner retroreflector constituted by three reflective surfaces which are substantially planar and perpendicular to each other and intersect at three edges which are substantially orthogonal and converge at an apex. The cube corner retroreflector is associated with a geometrical normal at the same angle to each of the three edges, and the target includes a reference point substantially on the normal on the opposite side to the reflective surfaces at a distance e.√3 from the apex, where e is the distance of this reference point from each of the surfaces. The target is characterized in that it embodies, facing each reflective surface, a parallel-sided plate which is transparent to the light to be retroreflected and is made from a material having a known refractive index n, the plates associated with the retroreflector having the same thickness e' such that, at least approximately, $$e' \cdot \sqrt{n} = 2.35e$$

In accordance with the preferred features of the invention, some of which may be combinable with others:

the transparent plates constitute a transparent pyramid of polygonal section disposed facing the cube corner retroreflector and having its normal coincident with the normal of the latter;

the pyramid has an equilateral triangle cross section;

the pyramid is at least approximately a cube corner;

the target includes a plurality of hollow cube corner retroreflectors which have a common reference point on their respective normals, each of the cube corner retroreflectors having three parallel-sided transparent plates parallel to the reflective surfaces of the retroreflector;

the reference point is at the same distance from the reflective faces of each cube corner retroreflector and the transparent plates have the same refractive index n and the same thickness e';

the cube corners together form at least part of a cube surrounding the plurality of cube corner retroreflectors;

the target includes eight cube corner retroreflectors;

the transparent plates are glass plates;

the target is a satellite whose center of mass constitutes the reference point;

the satellite includes a support structure for the cube corner retroreflectors made up of three mutually orthogonal panels; and the satellite spins about an axis parallel to two of the panels, the third panel being bordered by a ballast mass.

Objects, features, and advantages of the invention emerge from the following description given by way of non-limiting example with reference to the appended drawings.

DETAILED DESCRIPTION OF THE PREFERRED EMBODIMENT

Figure 1:
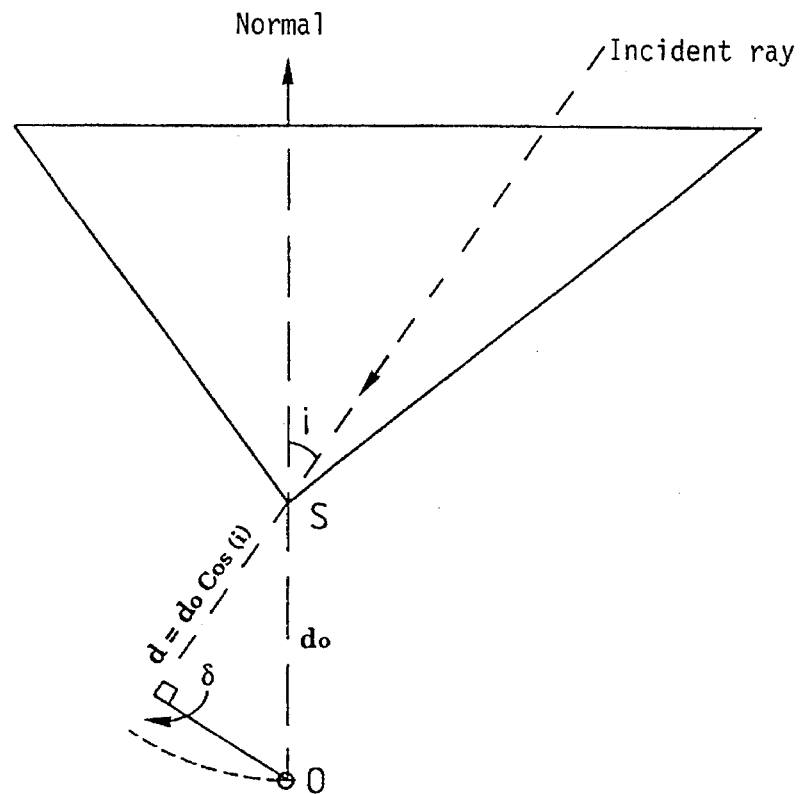
FIG. 1 is a diagram representing a conventional cube corner retroreflector, its normal, its reference point, and the correction to be applied.

The following description concerns, by way of example, a satellite formed of a plurality of CCR, for example a satellite as described in U.S. Pat. No. 5,474,264, with eight CCR whose faces are parallel and whose apexes are at the same distances $d_o$ from a reference point situated at least approximately on the normal of each CCR and coincident with the center of mass of the satellite. The satellite spins about a spin axis that is substantially fixed in space (or has an orientation which varies slowly) whose orientation relative to the satellite is preferably, although not necessarily, known. This satellite is in a known orbit. It constitutes a target for a plurality of laser ground stations each having a laser transmitter/receiver E/R which has a reference point. This ground station includes processor means that are conventional in themselves adapted to give from a single echo returned from a CCR of the target a "raw" measured value of the instantaneous distance between the E/R reference point and the position of the apex of the CCR at the time the latter returned the single echo in question, with an angle of incidence relative to the instantaneous direction of the normal of the CCR that is not known a priori.

Analysis of a succession of raw measured distances between the ground station and the laser satellite establishes the trajectory of the satellite in its orbit with great relative accuracy. Assuming that the laser station is capable of yielding these raw measurements with an accuracy in the order of one millimeter, the previously mentioned calculated correction mode ($0.9d_o$) would in theory be of sufficient relative accuracy for estimating the distance to the center to show up periodic fluctuations (on a scale of a few millimeters) of the apparent position of the center of mass relative to the nominal, locally smooth trajectory that would be expected.

This great sensitivity would enable detection of just these periodic fluctuations in this apparent position caused by failure to take into account errors δ varying as a function of i during spinning of the satellite. These apparent position fluctuations could probably be confirmed by correlation with the fluctuations in the mean intensity of the return echoes (if such intensity measurements were available, which is not always the case with existing stations), given that this intensity has a substantially deterministic dependency on the angle of incidence i. (The intensity is generally maximal for i=0° and tends toward zero for i~40°.)

The orientation and the spin speed of the satellite when it is deployed are known and from them it is possible to detect and to quantify any slow and progressive change in these parameters (which could be caused by precession or disturbance of the orientation, for example, or by reduction in the spin speed due to friction in the upper atmosphere) when analyzing estimated distance measurement data obtained over time by various SLR stations worldwide aiming at the same satellite. This would enable the development of an accurate model, updated at an adequate frequency, for predicting the spin parameters of the satellite, which would thus be available to all users.

Figure 2:
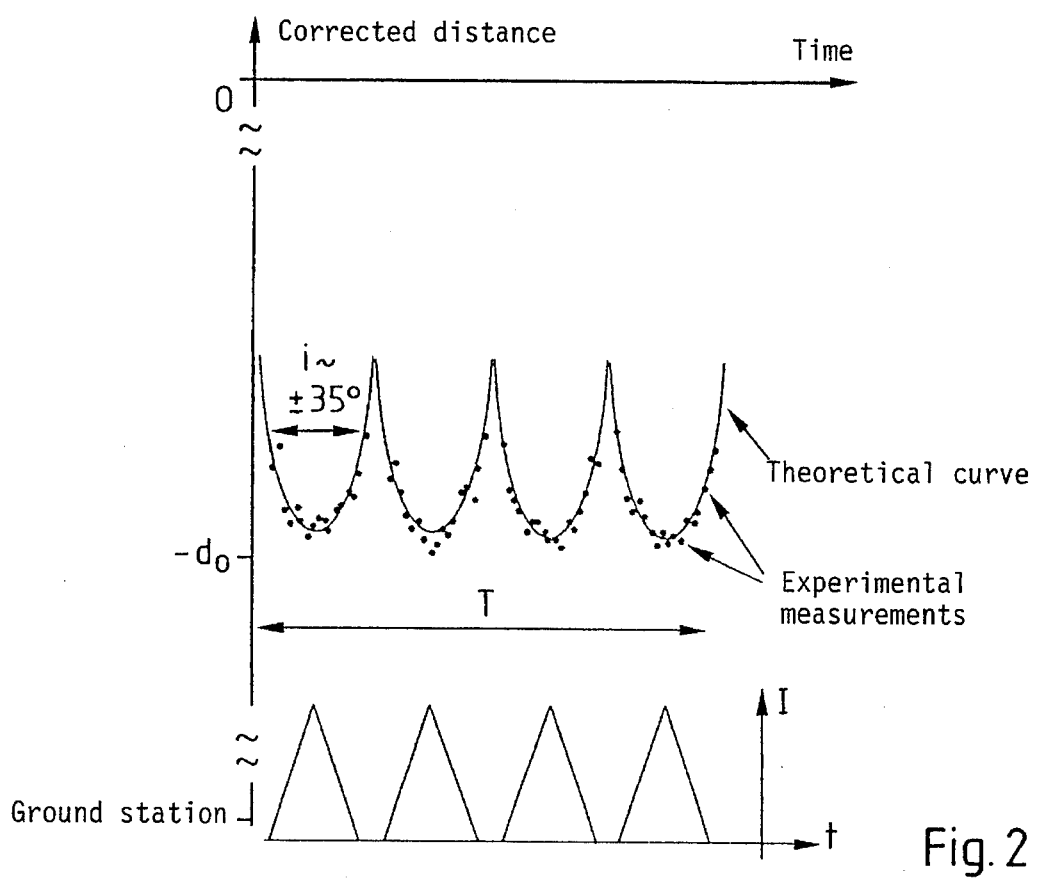
FIG. 2 is a curve showing the correlation during one revolution of a prior art satellite with eight substantially back-to-back CCR between the time variations of the raw distance measurements and the intensity I of The received return echoes.

It follows that for each pulse transmitted the instantaneous value of i could be determined with good accuracy by establishing the correlation between the predicted period and amplitude of its value and the values of its apparent measured position. FIG. 2 shows this correlation. Points corresponding to experimental values for the measured distance to the apex of the CCR (corrected for variations due to the nominal trajectory of the satellite) are compared with continuous curves corresponding to the variations predicted by a model based on the a priori knowledge of the satellite geometry and monitoring its spin. Adjustment of these two sets of values using the "least squares" method, for example, would accurately correct the geometrical influences relating to the variations in i.

In this figure, the value 0 at the left-hand end of the distance scale corresponds to a null correction whereby the actual distance to the center of mass and the value $d_o$ correspond to the raw measurement obtained when i has a null value, i.e. when the return echo travelled parallel to the instantaneous direction of the normal of the CCR at the time the echo was returned by the CCR. T is the spin period of the satellite. The bottom curve represents the intensity of the return echo (neglecting the travel time of the echo between its return by the CCR and its detection by the E/R).

The accuracy of the estimate of i, required for excellent correction of experimental distance measurements, is given by the following example: for values of $d_o$=5 cm and i≦35°, an error in the estimate of i of less than 1° would reduce the uncertainty on the correction of the experimental distance of the center of mass to less than 0.5 mm.

The means for post-correction (and therefore estimation) of the fluctuations in δ mentioned above would presuppose a number of conditions, such as good inertial stability of the spin of the satellite, and systematic analysis of these parameters by several SLR stations in order to establish and then to maintain the predictive model. At this time, it is not known whether this type of analysis is realistic and whether it will in fact enable the required millimeter level corrections to be achieved.

The inventors have therefore adopted an alternative approach which physically reduces the δ errors to a very low level.

To this end, the invention proposes to include between the exterior of the target and the reflective surfaces of the CCR a thickness of glass parallel to each of the surfaces on the optical path of the retroreflected rays so that, depending on i, the errors δ mentioned above are compensated optimally by the variations in the optical path of the glass members travelled through.

Figure 3:
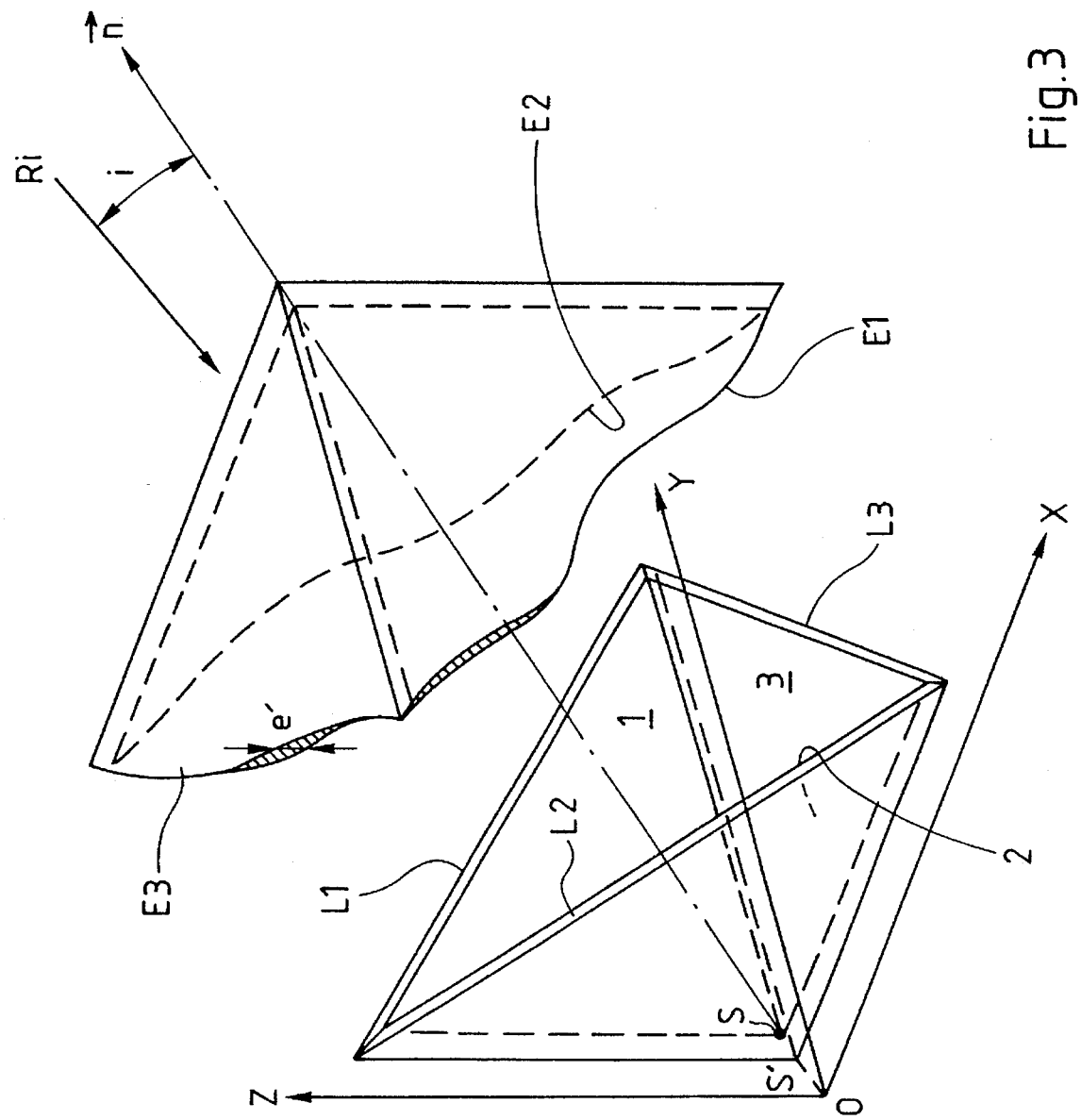
FIG. 3 is a diagrammatic representation of a cube corner retroreflector forming part of a retroreflective target in accordance with the invention.

FIG. 3 is a diagrammatic representation of a CCR which is part of a retroreflective target. This CCR is shown in a system of axes OXYZ such that O is the reference point of the target and the axes X, Y, and Z are parallel to the edges of the CCR.

This CCR has three substantially planar reflective surfaces intersecting at right angles on three substantially orthogonal edges converging at an apex S.

The above use of the term "substantially" is intended to allow for possible errors in the flatness of the reflective surfaces or possible departures from 90° of the angles between edges or between reflective surfaces or between edges that may be required to compensate for speed aberration.

In this example, the reflective surfaces 1, 2, and 3 are the metallized front faces of three parallel-sided glass plates L1, L2, and L3 together defining a cube corner with its normal $\vec{n}$.

The normal $\vec{n}$ is coincident with the normal of the geometrical cube corner formed by the surface OXY, OYZ, and OZX, i.e. with a direction at the same angle to the axes $\vec{X}$, $\vec{Y}$, and $\vec{Z}$.

The intersection apex S of the reflective surfaces (in this instance the hollow apex of the CCR, S' denoting the projecting apex) is at a distance $e\sqrt{3}$ from the reference point O where e is the distance from the apex S to each of the faces of the system of axes OXYZ (e is therefore an eccentricity).

In an alternative embodiment that is not shown, the reflective faces can be the metallized rear faces of plates transparent to the radiation to be retroreflected, for example glass plates. In this case, to prevent reflection of an incident ray Ri at the front faces of the glass plates the front faces are advantageously anti-reflection treated.

Facing each reflective surface 1, 2, and 3 is a parallel-sided plate E1, E2, or E3 transparent to the light to be retroreflected, these transparent plates having the same thickness e' and the same refractive index n. The incident radiation Ri passes through one of the transparent plates in one direction before entering the target. After being reflected by the reflective surfaces of the CCR, this radiation then passes in the opposite direction through one of the transparent plates (which may or may not be the same plate as that through which it entered). The presence of these transparent plates imposes on the radiation an optical path difference inversely proportional to the angle of incidence of the radiation to the plate in question. With reference to the normal of the cube corner, the optical path difference is therefore inversely proportional to the angle of incidence of the radiation to the normal.

The benefit of this is that by choosing an appropriate thickness e' of the plates E1, E2, and E3 it is possible to take advantage of the dependency of the optical path difference on the angle of incidence to compensate at least partly the dependency on the angle of incidence of the correction required to convert from the E/R-S distance to the E/R-O distance.

Three tests, for example, have been carried out with an eccentricity value e of 10 mm and a maximal excursion of 30° of the radiation from the CCR normal:

EXAMPLE 1

BK7 glass plate with
n=1.5
e'=19.5 mm
2δ=0.44 mm

EXAMPLE 2 extra dense flint (i.e. . . . ) glass with
n=1.8
e'=17.3 mm
2δ=0.42 mm

EXAMPLE 3

Zn-Sc plates using infrared radiation of 10 μm wavelength with
n=4
e'=11.8 mm
2δ=0.41 mm Note that the maximal fluctuation δ of the distance correction to be applied is less than 0.25 mm.

It seems reasonable to correlate the above results in the following empirical expression:

$$e' \cdot \sqrt{n} = 2.35e$$

which shows the existence of a proportional relationship between e and e'.

In fact, the fluctuations in the distance correction to be applied are shown above in the form 2δ because this is the peak-to-peak amplitude of the correction to be applied. The mean value of these corrections (corresponding to the middle of the 2δ range given above) was approximately 4.5 mm.

Of course, the maximal fluctuations δ are directly proportional to the authorized maximal angular error between the direction of the radiation and the CCR normal.

In this example, the transparent plates E1, E2, and E3 constitute part of a transparent cube corner whose normal is coincident with that of the CCR and whose concave side faces that of the CCR.

The complete target of which the CCR from FIG. 3 is part can be a microsatellite with eight cube corners as described in European Patent A 0,571,256.

Figure 4:
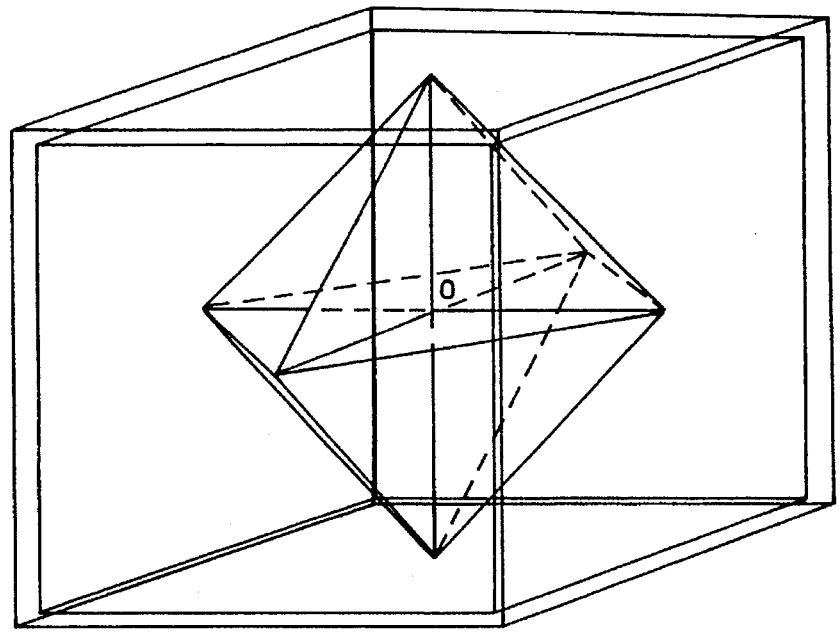
FIG. 4 is a diagrammatic perspective view of a retroreflective target with eight cube corners inside a transparent cage.

Thus, in an embodiment of the invention shown in FIG. 4, the target is a set of eight hollow CCR whose apexes are close together within a cubic glass cage formed of parallel-sided glass sheets whose faces are parallel to the reflective surfaces of the CCR. These glass sheets have the same thickness.

In FIG. 4, the internal edges of the glass cage are shown in full line to show that the glass cage is transparent. The thickness between adjacent reflective faces of the CCR has been ignored for reasons of simplicity.

The CCR is advantageously modular (see FIG. 5), i.e. the number of CCR is chosen to suit requirements, with a glass cage corner CV facing each CCR (the glass cage is thus itself modular, being formed from eight separate cube corners).

Figure 5:
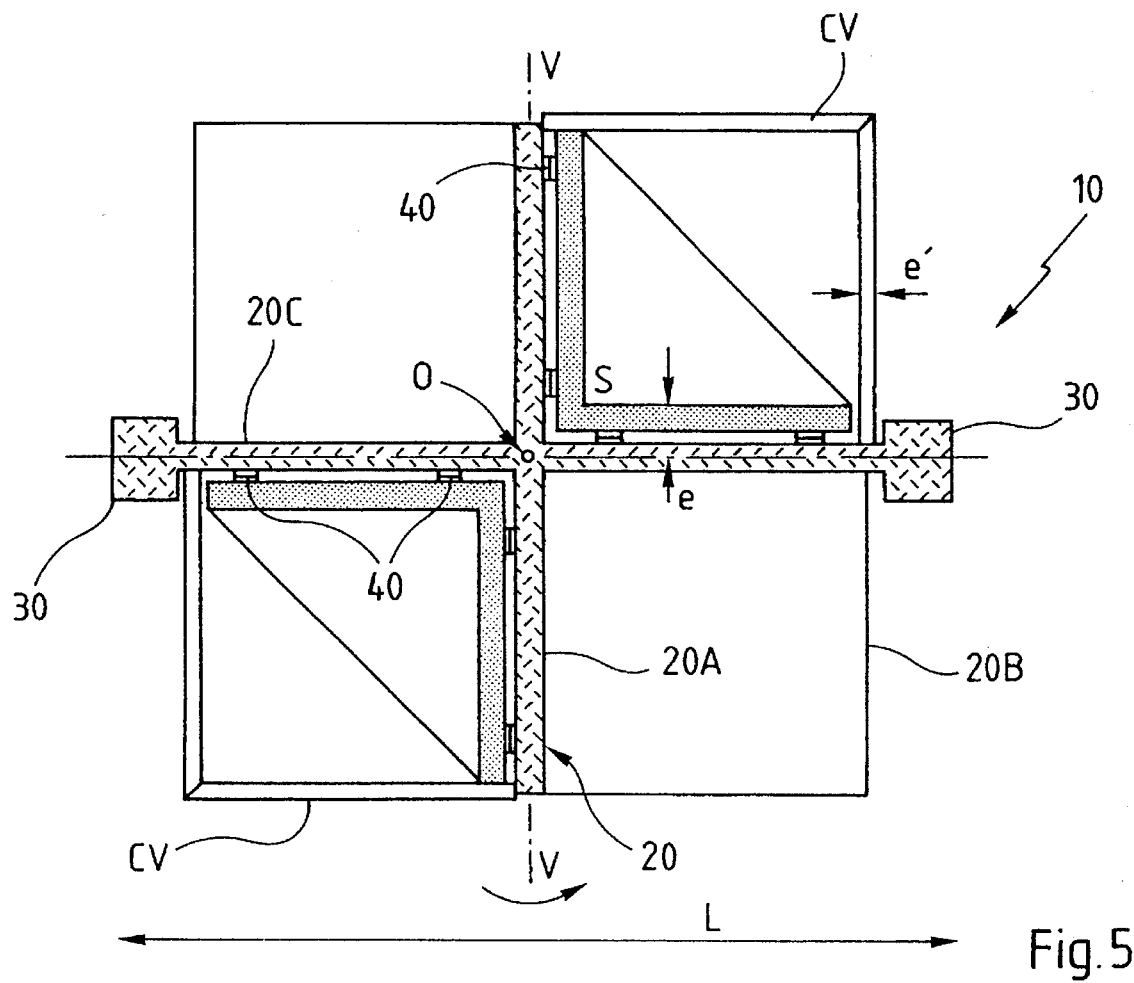
FIG. 5 is a view in section on a plane parallel to CCR faces of a modular retroreflective target with two CCR locations left vacant to make the drawing clearer.

In FIG. 5, the retroreflective target 10 includes a central structure 20 formed of three panels 20A, 20B, and 20C at right angles (they are square in this example), at the common intersection of which is located the center of mass O of the target. Alternatively, the structure panels can be disks.

In this example, the target is designed to spin about an axis V—V parallel to the intersection of two panels (20A and 20B) while any appropriate known form of ballast 30 is attached to the free edge of the last panel (20C).

The side length L of the cube in which the target is included (including the ballast) is in the order of 500 mm, for example, or even less.

CCR are fixed in the corners formed by the panels by means of fixing members 40 of any appropriate known type.

As before, e is the distance from the apex S of the CCR to each face of the reference system of axes, e' is the thickness of the plates constituting the transparent cage corner, and n is the refractive index of this material.

The CCR can be made from a transparent material and metallized on their rear face (see above). In this example, they are completely hollow in the sense that their inside faces are covered with a reflective coating, enabling consideration of use of opaque materials other than glass (for example, a metal or a ceramic with more favorable mechanical/thermal properties). The use of another material, chosen on the basis of a comparative study, could possibly also enable the choice of a smaller eccentricity e of the CCR with a corresponding reduction in the variations in δ.

Of course, the presence of the glass plates could be combined with the post-processing mentioned above with reference to FIG. 2, taking advantage if necessary of periodic distance fluctuations that can be attributed to periodic variations in i and/or periodic fluctuations in the intensity of the detected return echoes.

The system of FIG. 5 can be entirely passive, with no stabilizing member and no electrical or electronic components.

The system is in theory constructed so that its center of mass is equidistant from each of these apexes to within less than one millimeter and so that the normal of each CCR passes within one millimeter of the center of mass. To this end, the central structure is designed to combine the modular optical components accurately relative to the center of mass.

The modular design of the components is a beneficial feature which facilitates the replacement of defective or damaged components.

The microsatellite is designed to orbit a planet, for example, spinning at an angular speed typically in the order of one revolution per minute. This spinning is required not only to determine i (see FIG. 2) but also for reasons of thermal equilibrium of the system (see below).

It is desirable for the spin axis to be referred to a preferred direction of the satellite which corresponds to the main inertia axis. In a preferred embodiment of the invention, this condition is satisfied by preferential ballasting of the central structure as shown in FIG. 5. This is achieved (see above) by extending and ballasting this structure in one of its three orthogonal planes. For reasons concerning spin stability, it is preferable for the main moment of inertia to have a value at least twice and preferably a little more than ten times greater than that of these other moments.

When the satellite is deployed from the launch vehicle, spinning about the main inertia axis has to be initialized. The system will tend to maintain this spinning about the same axis, even in the presence of disturbances typical of the space environment (gravitational torques, solar pressure torques, and differential drag torques).

For reasons concerning thermal equilibrium, it is preferable for the spin axis to be oriented in a direction substantially perpendicular to the ecliptic, i.e. the plane of the Earth's orbit around the Sun. In this way, at least in the early life of the satellite, each CCR is exposed during one revolution of the satellite about its spin axis substantially equally to solar radiation and to cold space. This minimizes thermal/mechanical stresses (and consequently maintains correct optical performance in terms of return of incident pulses and even in terms of speed aberration correction) which could otherwise be generated by major temperature differences between the various CCR (sometimes illuminated by the Sun and sometimes in shade).

For reasons of small degradation of orbit (when the satellite is a remote sensing satellite) and the spin speed, it may be important to maintain a mass/surface area ratio (i.e. a mean density) that is as high as possible and compatible with optical, mechanical, and thermal constraints of the system.

Materials such as INVAR and tungsten-based alloys can therefore be considered for the central structure. Use of these same materials for fabricating the cube corners can be advantageous for the same reasons of high mean density.

Because of a requirement for uniformity in any deterioration of the orbit, it may be important, given the effects of atmospheric drag (low orbits) and radiation pressure, to ensure that the exterior of the satellite has good symmetry of revolution regardless of its orientation relative to the plane of the orbit. This is the case with the proposed structure, even if it features angular discontinuities.

On the basis of the typical thicknesses stated, a total satellite mass of 100 kg can be expected, which is within the realm of microsatellites.

Other possible applications of the concept are found in terrestrial or airborne laser ranging, and even for laser ranging from an instrument in orbit to reflectors also in orbit or on the Earth, whenever it is necessary to measure with great accuracy the (possibly very large) distance between two bodies.

It goes without saying that the foregoing description has been given by way of non-limiting example only and that numerous variants can be proposed by the person skilled in the art without departing from the scope of the invention. In particular, the target can be on a natural heavenly body (Earth, Moon, etc.) or an artificial heavenly body (satellite dedicated to other missions). Also, the various CCR can have different eccentricities, with glass plates whose thickness conforms to the condition as stated above in respect of this eccentricity.

The parallel-sided transparent plates do not need to be parallel to the reflective faces. This is not necessary from the optical point of view.

Calculation in fact shows that it can be advantageous for these parallel faces to constitute a triangular section pyramid more pointed than a cube corner. Generally speaking, this pyramid can have an angle between 50° and 110° between its adjacent faces. Given that the axis of the CCR and therefore of the pyramid is a sort of axis of symmetry of the CCR, it is not necessary for the pyramid to be of triangular section; it can have more than three faces.

What is claimed is:

1. A retroreflective target for laser ranging, said retroreflective target comprising:

at least one hollow cube corner retroreflector comprising three reflective surfaces which are substantially planar, are perpendicular to each other, and intersect at three edges, said three edges being substantially orthogonal to each other and converging at an apex, each of said at least one hollow cube corner retroreflector defining a geometrical normal lying at the same angle to each of said three edges;

a reference point coexisting on said geometrical normal at a predetermined distance from said apex in a direction away from said three reflective surfaces; and a parallel-sided plate for each surface of said at least one hollow cube corner retroreflector, each said parallel-sided plate spaced a predetermined distance from each surface of said three reflective surfaces, each parallel-sided plate further being transparent to a light to be retroreflected, made from a material having a known refractive index, and having the same thickness.

2. The retroreflective target according to claim 1, wherein said parallel-sided plate for each said surfaces of said at least one hollow cube corner retroreflector constitutes a transparent pyramid having a polygonal cross-section facing said at least one hollow cube corner retroreflector and having a normal coincident with said geometrical normal of said at least one hollow cube corner retroreflector.

3. The retroreflective target according to claim 2, wherein said transparent pyramid has an equilateral triangle cross-section.

4. The retroreflective target according to claim 3, wherein said transparent pyramid is a cube corner.

5. The retroreflective target according to claim 4, wherein each hollow cube corner retroreflector of said at least one hollow cube corner retroreflector together comprise a plurality of hollow cube corner retroreflectors which share said reference point positioned on said geometrical normals, and wherein each of said three parallel-sided transparent plates are each positioned parallel to its respective reflective surface of said each hollow cube corner retroreflector.

6. The retroreflective target according to claim 5, wherein said common reference point is at the same distance from said three reflective surfaces of each hollow cube corner retroreflector of said plurality of hollow cube corner retroreflectors, and wherein each said parallel-sided plate has the same refractive index and the same thickness.

7. The retroreflective target according to claim 6, wherein said cube corners of said plurality of hollow cube corner retroreflectors together form at least part of a cube surrounding said plurality of hollow cube corner retroreflectors.

8. The retroreflective target according to claim 1, wherein said at least one hollow cube corner retroreflector comprises a total of eight said hollow cube corner retroreflectors.

9. The retroreflective target according to claim 1, wherein each said parallel-sided plate is made of glass.

10. The retroreflective target according to claim 1, further comprising a satellite having a center of mass coinciding with said reference point.

11. The retroreflective target according to claim 10, wherein said satellite includes a support structure, for said at least one hollow cube corner retroreflector, made up of three mutually orthogonal panels.

12. The retroreflective target according to claim 11, wherein said satellite has a spin axis, said spin axis being positioned parallel to two panels of said three mutually orthogonal panels, and a ballast mass bordering said third panel.

13. A retroreflective target according to claim 1, wherein said predetermined distance equals $e.\sqrt{3}$ where $e$ is the normal distance from said apex to each of the three null planes of a three-dimensional Cartesian coordinate system where the origin of said coordinate system coincides with said reference point and where said three null planes are parallel with said three reflective surfaces, and wherein each said parallel-sided plate is made from a material having a known refractive index $n$ and having a thickness $e'$ such that, at least approximately, $e'.\sqrt{n}=2.35e$.

* * * * *